Aug. 6, 1957  F. DICK  2,801,879
VAPOR DISPENSING DEVICE
Filed Aug. 28, 1956

INVENTOR.
FRANKLIN DICK
BY Greene, Sireles &
Durr
ATTORNEYS

United States Patent Office 2,801,879
Patented Aug. 6, 1957

2,801,879

VAPOR DISPENSING DEVICE

Franklin Dick, New York, N. Y., assignor to Richard A. Fisch, New York, N. Y.

Application August 28, 1956, Serial No. 606,677

1 Claim. (Cl. 299—24)

This invention relates to a holder and dispenser for solid type of vaporizable material such as employed in insecticides, moth prevention, insect repellants, etc.

Among the objects of the invention is to provide a container provided with vapor dispensing openings which openings will not be stopped or clogged by the solid vaporizing material introduced into the container whereby a predetermined uniform dispensing of the vapors of the insecticide or similar material is obtained.

The objects of the invention are attained by providing a plastic tube with a plurality of longitudinal flutes extending outwardly therefrom the said flutes including longitudinal channels which communicate with the interior of the tube through relatively narrow passages. Staggered along the flutes a plurality of slots are cut to provide communication with the outside atmosphere. Such a tube is closed at both ends by suitable means. When this tube is filled with a moth proofing material such as nuggets of paradichlorbenzene, the latter product will sublime gradually and the vapors thereof pass upwardly through the channels of the flutes and outwardly, through the slots in the flutes to the atmosphere which is to be protected. The flutes provide a regular flow of air and vapors past and through the crystals or nuggets are retained inside of the fluted portions.

Figure 1:
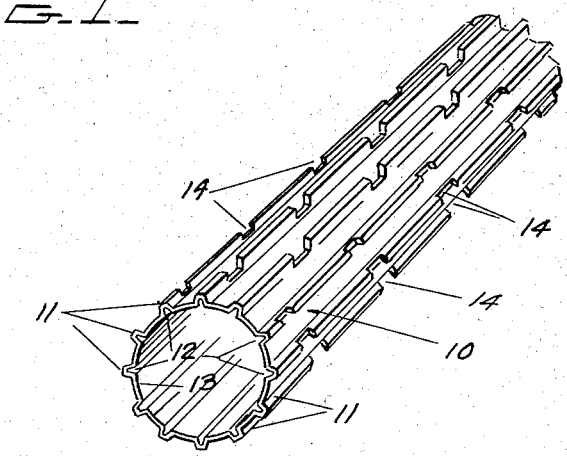
Fig. 1 is a section of tubing for making the dispenser of the invention.
Figure 2:
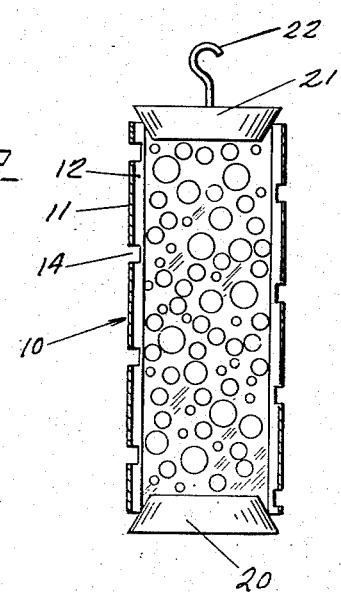
Fig. 2 is a cross sectional view of a dispenser made according to the invention.

In order to make the dispenser of the invention a fluted tube 10 having a plurality of flutes 11 each including a longitudinal channel 12 extending outwardly from the generally cylindrical wall 13 of the tube. The tube illustrated has twelve such flutes 11 but the number of flutes is not critical and two or more such flutes may be sufficient in some cases. Each of the flutes 11 contains a plurality of cut out regions 14 which provide communication between the inside of the tube and the outside atmosphere.

A very satisfactory method of making the tube of Fig. 1 is by extrusion of a transparent plastic material, thereafter cutting the slots 14 and cutting the tube to the length desired. A tube with an internal diameter of 1 inch is very satisfactory but it is obvious that it may be of any desired size. Also, elliptical or other forms of tubes may be employed. Satisfactory plastic materials which may be employed for manufacturing the tube are those which are thermoplastic, such as cellulose esters including cellulose ethers, such as ethyl cellulose, polyethylene, polypropylene, vinyl derivatives such as polyvinyl chloride, polystyrene, etc.

After the tube is cut to size one end may be closed by a stopper 20 and the other end is closed by a stopper 21 which may conveniently include a hook 22. One or both of said stoppers 20 and 21 are made removable so that the cylindrical portion of the tube can be filled with crystals or nuggets or a preformed molded piece of paradichlorbenzene or similar vaporizable material.

It can be seen that the ends of channels 12 are open and the channels are also open at the cut out regions 14 so that convection currents of air flow through channels 12 and out into the atmosphere through openings 14. The small area of communication between channels 12 and the inside of the tube are small enough to prevent the nuggets from getting into the channels so that the said channels remain unobstructed.

The features and principles underlying the invention described above in connection with specific exemplifications will suggest to those skilled in the art many other modifications thereof. It is accordingly desired that the appended claim shall not be limited to any specific feature or details thereof.

I claim:

A vapor dispensing device for use with solid vaporizable insecticides and similar solid materials comprising a tube means, said tube means comprising a tubular body portion and a plurality of integral longitudinal flutes extending outwardly from the body portion, each of said flutes having a longitudinal channel formed in the interior thereof and communicating with the interior of the tube means, said flutes also including a plurality of slotted portions providing communication between said channels and the outside atmosphere, a first closure means fitting in the bottom end of said tube means, and a second closure member fitting in the top end of said tube means, said closure means fitting within the body portion of said tube means but leaving the ends of the channels of said flutes open.

References Cited in the file of this patent

UNITED STATES PATENTS

| | | |
|---|---|---|
| 1,016,648 | Snell | Feb. 6, 1912 |
| 1,071,326 | Mass | Aug. 26, 1913 |
| 2,528,233 | Kubricht | Oct. 31, 1950 |